(12) United States Patent
Fujii et al.

(10) Patent No.: US 6,822,180 B2
(45) Date of Patent: Nov. 23, 2004

(54) PARTICLE SEPARATION MECHANISM

(75) Inventors: Yasuhisa Fujii, Kyoto (JP); Yusuhiro Sando, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 207 days.

(21) Appl. No.: 10/010,665

(22) Filed: Dec. 6, 2001

(65) Prior Publication Data
US 2002/0108889 A1 Aug. 15, 2002

(30) Foreign Application Priority Data
Dec. 8, 2000 (JP) .......................................... 2000-374852
Oct. 1, 2001 (JP) .......................................... 2001-305231

(51) Int. Cl.[7] .............................. B03C 7/00; B03C 1/00
(52) U.S. Cl. .................... 209/128; 209/214; 209/223.1; 209/232; 209/906; 436/52; 436/63; 422/81
(58) Field of Search ......................... 209/39, 128, 129, 209/130, 135, 208, 214, 223.1, 232, 906; 436/10, 520, 63; 422/81, 100

(56) References Cited

U.S. PATENT DOCUMENTS

| | | | | |
|---|---|---|---|---|
| 5,500,071 A | * | 3/1996 | Kaltenbach et al. ..... | 156/272.8 |
| 5,837,115 A | * | 11/1998 | Austin et al. ............... | 204/450 |
| 5,858,195 A | * | 1/1999 | Ramsey ...................... | 204/601 |
| 5,885,470 A | * | 3/1999 | Parce et al. ................... | 216/33 |
| 6,258,263 B1 | * | 7/2001 | Henderson et al. ...... | 210/198.2 |
| 6,403,957 B1 | * | 6/2002 | Fodor et al. ................ | 250/302 |
| 6,454,924 B2 | * | 9/2002 | Jedrzejewski et al. ...... | 204/601 |
| 6,579,452 B1 | * | 6/2003 | Moon et al. ............. | 210/198.2 |
| 2002/0164820 A1 | * | 11/2002 | Brown ........................ | 436/180 |

OTHER PUBLICATIONS

"Micro Total Analysis Systems 2000", *Proceedings of the µTAS 2000 Symposium, Enschede, The Netherlands, May 14–18, 2000*, Kluwer Academic Publishers title page, xvi page and pp. 473–476.

* cited by examiner

Primary Examiner—Donald P. Wang
Assistant Examiner—Joseph Rodriguez
(74) Attorney, Agent, or Firm—Sidley Austin Brown & Wood LLP

(57) ABSTRACT

A microchip comprises a flow pass in which a solution containing particles can flow, and a deflection mechanism for deflecting a portion of the particles as the particles flow through the flow pass.

19 Claims, 4 Drawing Sheets

PARTICLE SEPARATION MECHANISM

RELATED APPLICATIONS

This application is based on Japanese Patent Application Nos. 2000-374852 and 2001-305231 filed in Japan on Dec. 8, 2000 and Oct. 1, 2001, respectively, the entire contents of which are hereby incorporated by reference.

FIELD OF THE INVENTION

The present invention relates to a particle separation mechanism. In one embodiment, the present invention relates to a particle separation mechanism which can be used to separate particles contained in a solution.

BACKGROUND OF THE INVENTION

Recent attention has focused on $\mu$-TAS (micro total analysis system) for miniaturizing devices for use in various processes of chemical analysis and synthesis and the like, and for applications to micromachine art.

For example, there is a concept of a separation system using $\mu$-TAS for separating particles contained in a solution. A microstructure is formed in a flow pass by micro processing art, and loaded in a polymer gel to form a filter for separating particles by size.

In this case, the filter is formed from the bottom surface to the top surface of a flow pass, over the entire cross section of the flow pass. For this reason, when particles are separated by the filter, and a pump is used to provide the propulsion force for the solution containing the particles, the size of the holes of the filter generally used for separation (which can range from sub micron level to approximately 30 $\mu$m) are too small and increase the flow pass resistance, such that it is difficult for the solution to pass through the filter.

Furthermore, when a solution passes through a filter having relatively large holes, the solution being propelled via a pump which generates an extremely strong pressure, although particle separation is initially possible, eventually the separated particles block the holes of the filter, thereby greatly increasing the flow pass resistance such that the solution cannot be transported.

SUMMARY OF THE INVENTION

Accordingly, a problem of the art to be resolved by the present invention is to provide a particle separation mechanism capable of efficient and continuous particle separation.

To resolve the previously mentioned problems of the art, one embodiment of the present invention provides a microchip having a particle separation mechanism with the structure described below.

The microchip comprises a flow pass in which a solution containing particles can flow, and a particle separation mechanism. The particle separation mechanism comprises a deflection mechanism, which generates an electric field or magnetic field in a transverse direction of the flow pass. The field is generated in a deflection region of the flow pass so as to alter a direction of flow of the particles. The particle separation mechanism further comprises a particle capture unit disposed on a side of the flow pass to which the particles are directed by the deflecting mechanism so as to capture the particles.

In this structure, as the particles in the solution flowing through the flow pass approach the deflection region, the particles are directed to one side of the flow pass. The direction of flow of the particles is deflected in the direction of an electric field or a magnetic field (or in a direction opposite the electric field or the magnetic field) by the deflection mechanism. The particles can thus be captured by the particle capture unit disposed at this location. In this way, the desired particles can be separated from a solution containing the particles.

According to this structure, an electric field or magnetic field is generated in a direction transverse to the flow pass to separate the particles. Since a direction transverse to the flow pass (e.g., the width direction or the height direction of the flow pass) has an extremely small dimension when compared to the length direction of the flow pass, only a small voltage or magnetic force is required to generate a desired electric field or magnetic field.

Accordingly, a structure generating a relatively low electric field or magnetic field may be used as the deflection mechanism, such that the particle separation mechanism can be made compact and inexpensive.

Specifically, the particle capture unit may be structured in various embodiments as described below.

In a first embodiment, it is desirable that the particle capture unit include a projection. The projection has a radix end on a surface on the deflection side of a surface forming the flow pass. The projection partially extends into the flow pass and thus occupies only a part of the cross section of the flow pass.

In this structure, the projection of the particle capture unit is disposed on one side of the flow pass (the deflection side) in a direction traverse to a direction of flow of the flow pass. The particles in the solution are attracted by the electric field or the magnetic field, and are captured on the projection. The particles accumulated on the particle capture unit are released from the particle capture unit by, for example, the deflection mechanism generating an electric field or a magnetic field in the opposite direction, and are collected when they flow downstream.

According to this structure, since the particle capture unit does not have exclusive possession of the entire outflow cross section of the flow pass, and is only disposed in a portion of the deflection side of the flow pass, the captured particles do not block the entire cross section of the flow pass, and do not hinder the flow of the solution. Accordingly, continuous, efficient particle separation occurs.

The projection may have an optional form. For example, the projection may be a plate extending in a direction transverse to a direction of flow of the flow pass. Alternatively, an indentation may be formed by circumscription by the projection, such that this indentation opens to the center of the flow pass. In order to efficiently capture particles, it is desirable that a plurality of columnar projections are provided, such that a solution flows among the columns.

It is desirable that the particle capture unit includes a plurality of columnar projections. In one embodiment, the space between adjacent projections is 0.1 $\mu$m or more, but less than 50 $\mu$m.

This structure is suitable for extracting blood plasma components by attracting erythrocytes, leukocytes, and thrombocytes to the projections for removal from whole blood.

In a second embodiment, the flow pass includes a single main flow pass on the upstream side (in the direction of flow), and includes two or more branch flow passes branching from the main flow pass in the downstream direction (in the direction of flow). In this case, the deflection region is near the junction (branch point) of the main flow pass and the branch flow passes, and a deflection mechanism is provided with electrodes (or other types of field generators) in or near each branch flow pass and proximate the junction (branch point). In a more specific embodiment, the branch flow passes are arranged so as to be between the electrodes.

In this embodiment, in one branch flow pass, voltages of different electrical potentials are applied to the electrodes, which are arranged on bilateral sides of the branch flow pass, with the branch flow pass therebetween. The electrodes generate an electric field in a transverse direction to the branch flow pass. In the other branch flow pass, however, voltages of identical electric potential are applied to the electrodes, which are arranged on bilateral sides of the branch flow pass, with the branch flow pass therebetween. In this way, particles in the solution are attracted to the branch flow pass in which an electric field is generated in the transverse direction of the branch flow pass, so as to flow into this branch flow pass.

In this structure, voltages of different electric potential are applied to electrodes disposed bilaterally on the branch flow passes, such that the branch flow pass in which the electric field is generated in a transverse direction of the branch flow pass can selectively become the particle capture unit.

According to this structure, particle extraction is simple since captured particles flow through the branch flow pass. Moreover, particles may be continuously collected, such that a special operation is unnecessary to remove the particles accumulated by the particle capture unit.

It is desirable that the electrodes are formed as low resistance parts doped with a high concentration of an impurity on a silicon substrate. The flow pass is formed by partially removing the region doped with the impurity on the substrate via an etching process.

According to this structure, the microchip having flow passes (main flow pass and branch flow passes) and electrodes can be easily and efficiently manufactured using a micromachining process.

Furthermore, a microchip in accordance with another embodiment of the present invention is provided with a flow pass in which a solution containing particles can flow, and a particle separation mechanism. The particle separation mechanism comprises a filter (particle capture unit), including projections, each having a radix end on one side of the surface forming the flow pass. Only a part of the projections, which forms the filter, has exclusive possession of the side surface in a cross section of the flow pass.

According to this structure, since the particle capture unit does not have exclusive possession of the entire outflow cross section and is only disposed at part of the other side of the flow pass, the captured particles do not block the entire cross section direction of the flow pass, and do not hinder the flow of the solution. Accordingly, continuous, efficient particle separation occurs.

Various structures may be used as the filter. For example, the filter may be a microstructure formed within the flow pass using a micromachining process, porous glass or porous silicon may be adhered to a wall surface of the flow pass, or an anode may be formed on the wall surface of the flow pass.

A microchip in accordance with another embodiment of the present invention comprises a main flow pass in which a solution containing particles can flow, and a particle separation mechanism. The particle separation mechanism comprises a first branch flow pass and a second branch flow pass branching from the main flow pass. The first and second branch flow passes are disposed on the downstream side of the main flow pass. The particle separation mechanism further comprises a first electrode pair disposed with the first branch flow pass therebetween near the branch point with the main flow pass, and a second electrode pair disposed with the second branch flow pass therebetween near the branch point with the main flow pass.

In this embodiment, in one branch flow pass, voltages of different electrical potentials are applied to the electrode pair, which are arranged on bilateral sides of the branch flow pass, so as to generate an electric field in the transverse direction of the branch flow pass. In the other branch flow pass, however, voltages of identical electrical potentials are applied to the electrode pair, which are arranged on bilateral sides with the branch flow pass therebetween. In this way, particles in the solution are attracted to the branch flow pass in which an electric field is generated in the transverse direction of the branch flow pass, so as to flow into this branch flow pass.

One electrode of the first electrode pair and one electrode of the second electrode pair may be used in common, thereby simplifying the electrode structure.

The first and second electrode pairs may be formed by doping a high concentration of an impurity on a silicon substrate, and the flow pass may be formed by partially removing the region doped with an impurity on the substrate by an etching process.

In any of the aforesaid microchips, a micropump may be provided to produce the flow of a solution containing particles through the flow pass.

Each embodiment of the particle separation mechanism is suitable for use in a particle separation device for separating particles from a solution. In one embodiment, the particle separation device is provided with a micropump drive circuit for driving the micropump of the particle separation mechanism, a deflection control circuit for driving the deflection mechanism (or a voltage circuit for applying a voltage to the electrode), and a control circuit for controlling the operation of the micropump drive circuit and the deflection control circuit or voltage circuit.

The present invention further provides the particle separation method described below.

The particle separation method is a method of the type for separating particles from a solution using a particle separation mechanism. One embodiment of the particle separation method comprises a first step of producing a flow of a solution containing particles through a flow pass, a second step of forming an electric field or magnetic field in a direction transverse to the flow pass in a deflection region and deflecting or attracting particles within the solution flowing through the flow pass to one side surface of the flow pass (the deflection surface), and a third step of capturing the particles attracted to the side surface by a microstructure formed on the side surface.

The present invention further provides a particle separation method described below.

The particle separation method is a method of the type for separating particles from a solution using a particle separation mechanism. One embodiment of the particle separation method comprises a first step of producing a flow of a solution containing particles through a flow pass including a main flow pass and a plurality of branch flow passes branching from the main flow pass, a second step of setting to a desired electric or magnetic potential the bilateral side surfaces of a branch flow pass for each branch flow pass near the branching part of the flow pass, and a third step of deflecting or attracting particles within the solution flowing in the flow pass to one or another of the branch flow passes so as to flow through that branch flow pass by means of an electric field or magnetic field formed by the potential set in the second step.

BRIEF DESCRIPTION OF THE DRAWINGS

A more complete understanding of the present invention and its advantages will be readily apparent from the following Detailed Description of the Preferred Embodiments taken in conjunction with the accompanying drawings. Throughout the accompanying drawings, like parts are designated by like reference numbers, and in which.

DETAILED DESCRIPTION OF THE PREFERRED EMBODIMENTS

The various embodiments of the particle separation mechanism of the present invention are described hereinafter with reference to the accompanying drawings.

A first embodiment of the particle separation mechanism is described below.

The particle separation mechanism of the first embodiment is structured so as to have the height of the microstructure forming the filter (particle capture unit) within the flow pass be less than the depth of the flow pass, so as to mitigate the extreme increase in flow pass resistance caused by the filter. That is, in one embodiment, a filter comprised of the microstructure is present on only the bottom side in the depth direction of the flow pass, and is not present on the top side in the depth direction. A voltage can be applied between the flow pass floor and tectum in the region in which the microstructure is formed within the flow pass (the deflection region) so that particles attempting to separate from the part lacking the filter cannot escape. Then, as particles, which are the target of separation from the solution, are attracted to the filter part (i.e., the region in which the microstructure is formed) by electrophoresis, the solution is caused to flow via the pumping force, such that the particles are captured and separated at the region formed by the microstructure. Since the particles are attracted to the filter region by electrophoresis in the present embodiment, the separation targets are particles which can be electrically attracted, e.g., electrically chargeable particles. However, the present invention is not limited to this mode. For example, in immunological examinations, antigens or antibodies can be attached to a magnetic particle and separated from the solution, and in this instance the particles can be attracted to the filter region by a magnetic force.

Figure 1A:
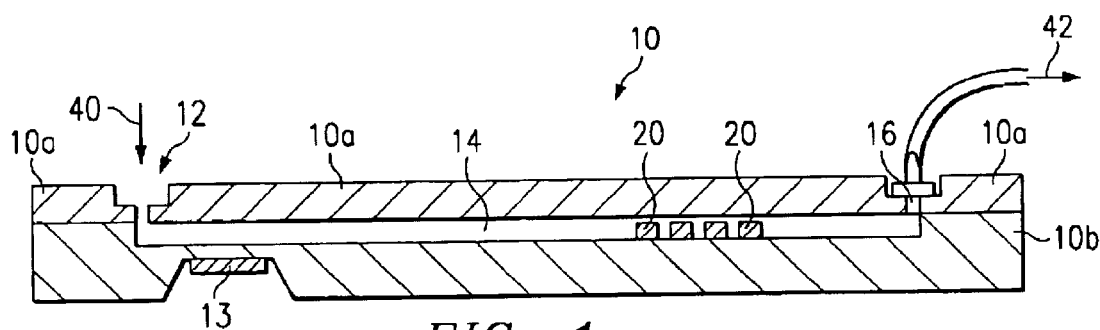
FIGS. 1(a) and 1(b) show a cross sectional view and a schematic plan view, respectively, of the structure of a first embodiment of a microchip having a particle separation mechanism of the present invention.
Figure 1B:
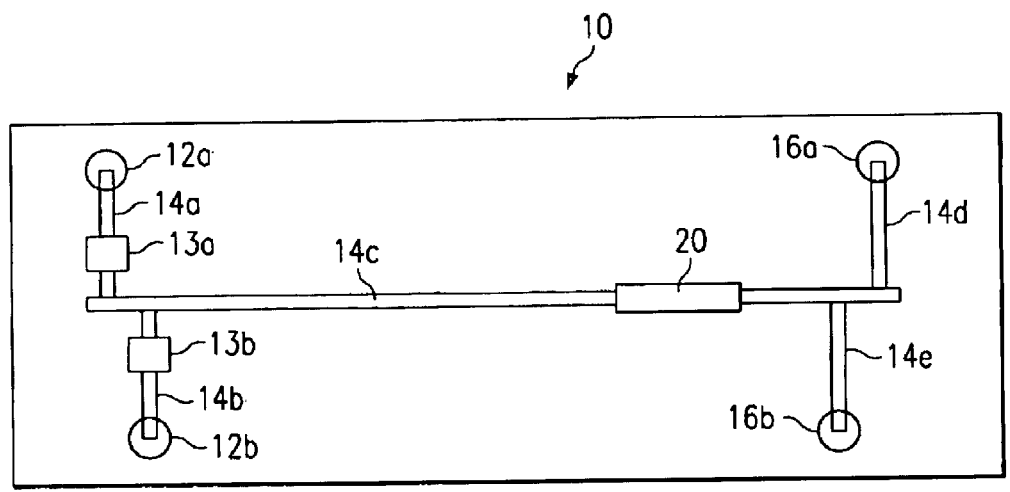
Figure 2:
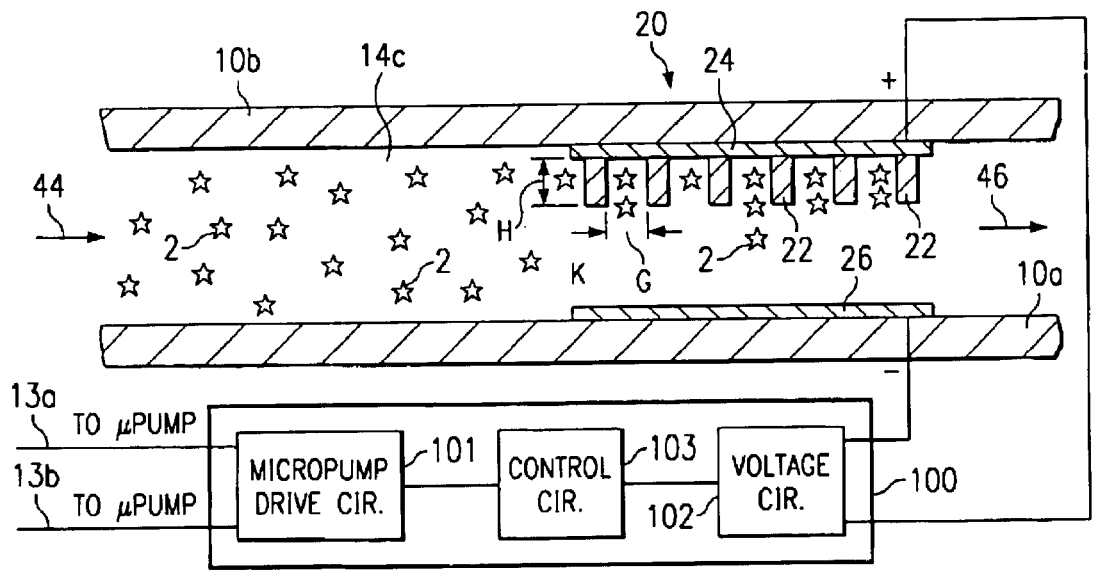
FIG. 2 is an enlarged view of a part of the structure shown in FIG. 1(a)

Specifically, an embodiment of a microchip 10 having the particle separation mechanism may have the structure shown in FIGS. 1(a), 1(b) and 2. The microchip 10 can be installed in a particle separation device 100.

As shown in the cross sectional view of FIG. 1(a), the microchip 10 comprises a fine flow pass 14 formed on a substrate 10b, and is covered by a cover 10a. For example, in one embodiment, the external dimensions of the microchip 10 are 20×40×0.5 mm. The width of the flow pass 14 is 200 $\mu$m, and the depth is approximately 100 $\mu$m.

A solution inlet 12 is provided at one end of the flow pass 14 to supply solution in a direction as indicated by the arrow 40. A solution outlet 16 is provided at the other end of the flow pass 14 to discharge solution in a direction as indicated by the arrow 42. In the flow pass 14 are disposed a micropump 13 for delivering solution to the solution outlet 16 side, and a particle separation mechanism 20 for capturing particles contained in the solution.

Specifically, two solution inlets 12a and 12b, two micropumps 13a and 13b, two solution outlets 16a and 16b, and a plurality of branch flow passes 14a, 14b, 14c, 14d, 14e are provided, as shown in the schematic plan view of FIG. 1(b). The micropumps 13a and 13b are diffuser-type pumps which deliver solution by a unimorph drive. For example, the micropumps 13a, 13b can be formed by pasting a piezoelectric element to an oscillation plate.

The particle separation mechanism 20 is provided with electrodes 24 and 26 arranged on a cover 10a and a substrate 10b, respectively, circumscribing a flow pass 14c. The particle separation mechanism 20 is also provided with a plurality of projections 22 having a high aspect ratio protruding in the transverse direction of the flow pass from the electrode 24 side to the approximate center of the flow pass 14c.

The height H of the projection 22 is less than the depth of the flow pass. The gap G between adjacent projections 22 can be suitably determined in accordance with the particle size. For example, when removing erythrocytes, leukocytes, and platelets from whole blood to extract the plasma component, the gap G between adjacent projections 22 is desirably 0.1 $\mu$m or greater, but less than 50 $\mu$m.

The electrodes 24 and 26 and the projections 22 may be sequentially formed, for example as shown in FIGS. 3(a)–(h), by applying micro processing art used in the field of semiconductors.

Figure 3A:
FIGS. 3(a) through 3(h) illustrate a process for manufacturing the microchip of FIG. 1.
Figure 3B:
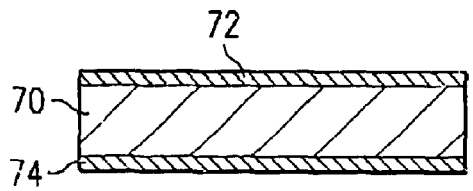

First, a silicon wafer 70 is prepared as shown in FIG. 3(a). Then, on the top and bottom surfaces of the silicon wafer 70 are formed, for example, oxidation layers 72 and 74 of approximately 1.5 $\mu$m thickness by thermal oxidation.

Figure 3C:
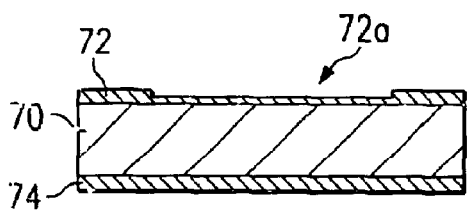

Then, after a resist is developed on the oxidation layer 72 by painting or optical exposure, part of the oxidation layer 72 is removed by etching, and the remaining resist is peeled off to produce a thin layer 72a of part of the oxidation layer 72, as shown in FIG. 3(c).

Figure 3D:
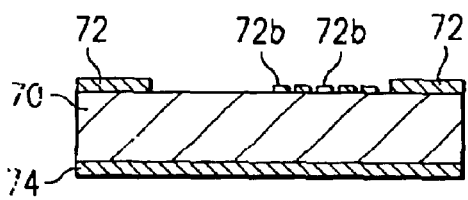

Next, after a resist is developed on the oxidation layer 72 which has been thinned to the thin layer 72a by painting or optical exposure, the oxidation layer 72 is etched, the remaining resist is peeled off, and the entirety of the oxidation layer 72 corresponding to the flow pass 14 is removed, such that an oxidation layer 72b, which corresponds to the projections 22 and is thinner than the oxidation layer 72 remains, as shown in FIG. 3(d).

Figure 3E:
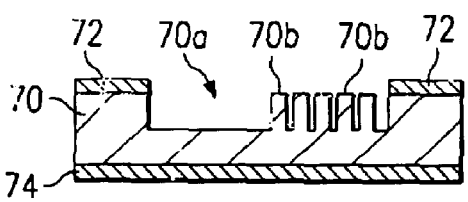

Next, the silicon 70 is etched by a dry etching method of REI (reactive ion etching) to accomplish anisotropic dry etching of the substrate at high speed via ions, and subsequently by ICP (inductively coupled plasma) or deep REI (deep reactive ion etching), anisotropic dry etching methods capable of deep channel processing. Then, the oxidation layer 72b is removed by etching. In this way, the part 70b adjacent to the projections 22 remains, and the part 70a comprising the flow pass 14 is removed to mid way from the silicon wafer 70, as shown in FIG. 3(e).

Figure 3F:
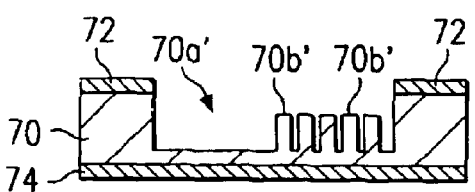

Next, the silicon wafer 70 is again etched using ICP. In this way, the part 70b' comprising the projections 22, and the part 70a' comprising the flow pass 14 are formed on the silicon wafer 70, as shown in FIG. 3(f).

Figure 3G:
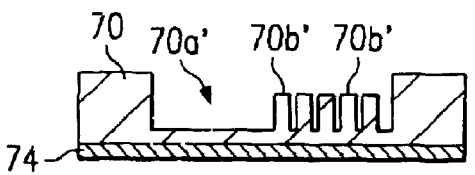
Figure 3H:
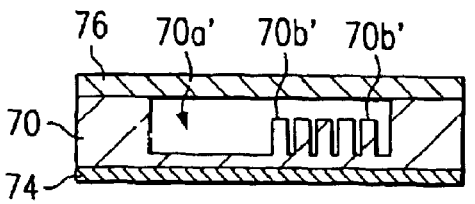

Next, the remaining oxidation layer 72 is removed by etching as shown in FIG. 3(g). Then, a cover 76 is placed over the silicon wafer 70, and cemented, for example, by applying a voltage of 900 V at 400° C.

In each of these processes, the resist application is applied to a thickness of 1.0 μm by, for example, spin-coating a resist, such as OFPR800 (from Tokyo Ohka Co., Ltd., Japan). Optical exposure of the resist is accomplished, for example, by aligner. Development of the resist is accomplished, for example, using a developing solution such as NMD-3 (from Tokyo Ohka Co., Ltd., Japan). Oxidation layer etching is accomplished, for example, by reactive ion etching using $CHF_3$ as a gas. Resist peeling is accomplished, for example, using a combination of sulfuric acid and hydrogen peroxide.

The electrode 24 on the substrate 10b side is formed by low resistance doping of a high concentration impurity (e.g., antimony, boron or the like) beforehand on a part of the silicon wafer 70 corresponding to the location of the projections 22. The electrode 26 on the cover 10a side is formed by vacuum deposition of a metal or the like before cementing the cover 10a to the substrate 10b.

An embodiment of a particle separation device 100 in which the microchip 10 is installed is provided with a micropump drive circuit 101 for driving the micropumps 13a and 13b of the microchip 10, a voltage circuit 102 for supplying voltages to the electrodes 24 and 26, and a control circuit 103 for controlling the operation of the micropump drive circuit 101 and voltage circuit 102.

An embodiment of a method for separating particles using the microchip 10 is described below.

For example, a solution containing particles is supplied to one fluid inlet 12a of the microchip 10. The solution containing particles flows through the flow passes 14a, 14c, 14d via the micropump 13a, and is discharged from one solution outlet 16a.

At this time, a voltage is applied to the electrodes 24 and 26 so as to generate an electric field between the electrodes 24 and 26. When the particles 2 in the solution flowing through the flow pass 14c (as indicated by the arrow 44) have, for example, a negative electrical charge as shown in FIG. 2, these particles 2 are attracted to the electrode 24 side and captured by the projections 22 provided on the electrode 24 side, and accumulate in the particle separation mechanism 20. Therefore, only the solution flows downstream from the particle separation mechanism 20 as indicated by the arrow 46. That is, the particles 2 are separated from the solution containing the particles 2, and only the solution is recovered from the solution outlet 16a.

Next, a washing solution is supplied through the other solution inlet 12b of the microchip 10. The washing solution flows through the flow passes 14b, 14c, 14e via the micropump 13b, and is discharged from the other solution outlet 16b.

At this time, for example, a positive-negative reverse voltage is applied to the electrodes 24 and 26 so as to generate an electric field in the opposite direction between the electrodes 24 and 26. In this way, particles 2 accumulated in the particle separation mechanism 20 move to the electrode 26 side (the side opposite from the projections 22), and are discharged from the solution outlet 16b together with the washing solution. That is, the separated particles 2 can be recovered from the solution outlet 16b.

The microchip 10 may have a filter (microstructure) formed by the projections 22 within the flow pass. The microchip 10 may use micropumps 13a and 13b as the main propulsion force of the solution. Approximately half the flow pass 14c is not covered by the filter, and since the particles 2 are attracted at about a right angle direction to the flow on the filter side from that part, an acute increase in the flow pass resistance is not generated by the filter during particle separation. Furthermore, solution may flow continuously, and there is very little deterioration of the particle separation function over time.

An advantage of the present embodiment is that the electrodes 24 and 26 are provided on the walls of the flow pass, and since the electrodes are near one another, only a low voltage is required to attract the particles 2 by electrophoresis, such that the particle separation device 100 may be made compact and inexpensive. However, when low voltage and compactness are not required, the electrodes 24 and 26 also may be provided on the particle separation device rather than on the microchip 10.

A second embodiment of the particle separation mechanism of the present invention is described below.

The particle separation mechanism of the second embodiment does not provide a filter, which is the cause of the increase in flow pass resistance within the flow pass, but does provide a Y-shape branch within the flow pass, such that particles (separation particles) may be directed and separated in an optional direction by applying a voltage to the right side or a voltage to the left side.

Figure 4A:
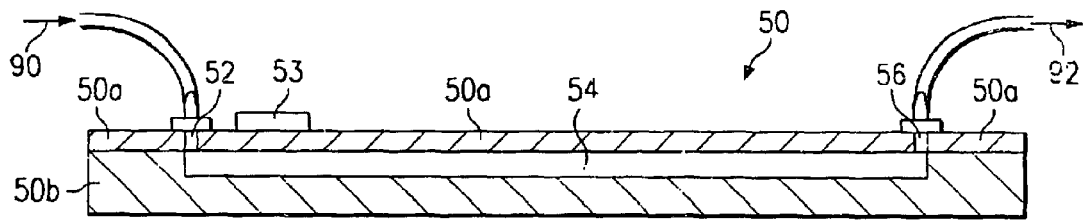
FIGS. 4(a) and 4(b) show a cross sectional view and a schematic plan view, respectively, of the structure of a second embodiment of a microchip having a particle separation mechanism of the present invention.
Figure 4B:
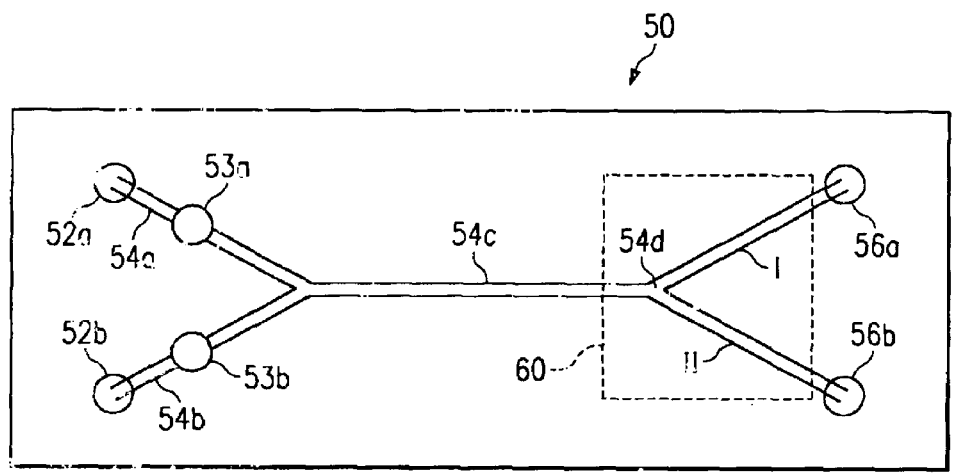
Figure 5:
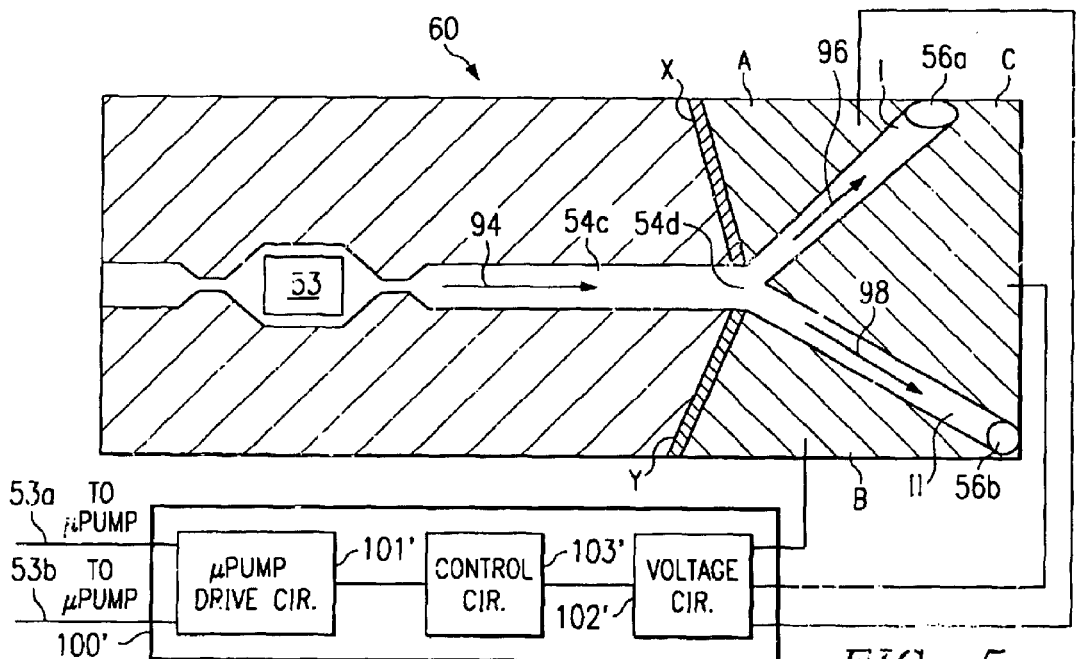
FIG. 5 is a schematic view of a part of the structure of FIG. 4(b)

FIGS. 4(a), 4(b), and 5 show a microchip 50 using the second embodiment of the particle separation mechanism of the present invention.

As shown in the cross sectional view of FIG. 4(a), the microchip 50 comprises a fine flow pass 54 formed on a substrate 50b and covered by a cover 50a. One embodiment of the microchip 50 has the same dimensions and structure as the previously described microchip 10.

One end of a flow pass 54 is provided with a solution inlet 52 for supplying solution as indicated by the arrow 90, and the other end is provided with a solution outlet 56 for discharging solution as indicated by the arrow 92. Within the flow pass 54 are disposed micropumps 53a and 53b for delivering a solution.

Specifically, as shown in the schematic plan view of FIG. 4(b), two solution inlets 52a and 52b, two solution outlets 56a and 56b, and a plurality of branch flow passes 54a, 54b, 54c, I, II are provided. Within the flow passes 54a and 54b are provided micropumps 53a and 53b. The flow pass 54c is the main flow pass, and flow passes I and II are branch flow passes.

The vicinity 60 of the flow pass junction 54d is shown in the schematic drawing of FIG. 5.

Insulators X and Y are disposed between the flow pass 54c and flow pass I, and between the flow pass 54c and flow pass II, respectively. Three mutually insulated electrodes A, B, and C are formed between the insulator X and flow pass I, the insulator Y and flow pass II, and flow pass I and flow pass II, respectively. Specifically, the flow passes I and II are formed by etching the low resistance part near the surface of the silicon substrate 50*b*, which is partially doped with a high concentration impurity (e.g., antimony, boron), and the walls of the flow passes I and II become the electrodes A, B, C.

The microchip 50 directs negatively charged particles to flow pass I or II by combining and applying voltages shown in, for example, Table 1 to each electrode A, B, C from a voltage circuit 102' of the particle separation device 100'. A control circuit 103' controls the operation of a micropump drive circuit 101' and the voltage circuit 102'.

TABLE 1

| Separation direction | A voltage | B voltage | C voltage |
|---|---|---|---|
| I | + | − | − |
| II | − | + | − |

That is, an electric field is generated in a downward direction in the drawing of FIG. 5 in the vicinity of the flow pass junction 54*d* when a positive voltage is applied to electrode A, and a negative voltage is applied to electrodes B and C. In this way, when particles flowing together with the solution in the direction of arrow 94 via the micropump 53 are negatively charged, these particles move upward in the drawing in the vicinity of the flow pass junction 54*d*, and after passing through the flow pass junction 54*d*, flow through the flow pass I side as indicated by the arrow 96.

On the other hand, an electric field is generated in an upward direction in the drawing in the vicinity of the flow pass junction 54*d* when a negative voltage is applied to electrodes A and C, and a positive voltage is applied to electrode B. In this way, when particles are negatively charged, these particles move downward in the drawing in the vicinity of the flow pass junction 54*d*, and after passing through the flow pass junction 54*d*, flow through the flow pass II side as indicated by the arrow 98.

In other embodiments, the branching flow passes are not limited to two, and may be three or more.

Figure 6:
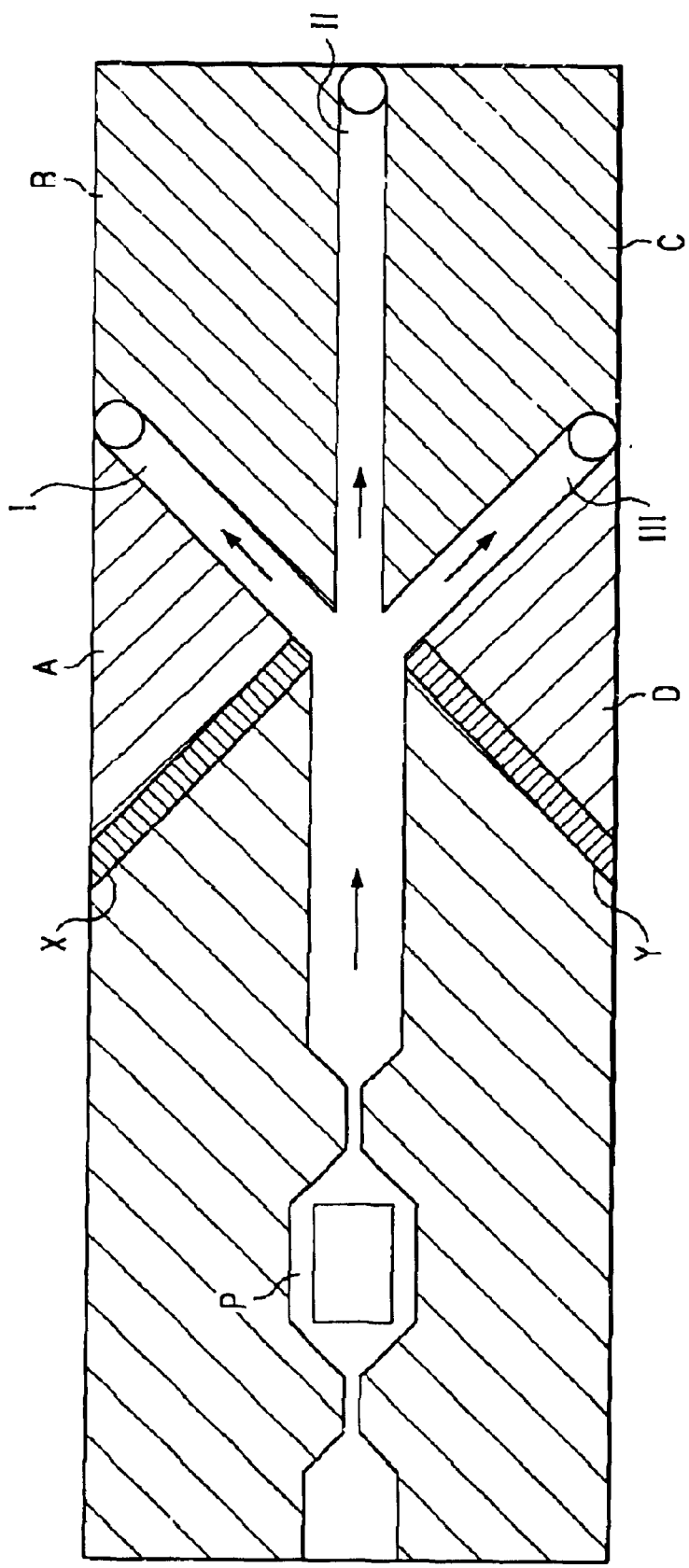
FIG. 6 is a schematic view of another embodiment of the microchip of the present invention.

For example, as shown in FIG. 6, when mutually insulated electrodes A, B, C, and D are provided between three flow passes I, II, and III and between insulators X and Y, negatively charged particles flowing in the solution via a micropump P can flow through a desired flow pass I, II, or III by, for example, applying the voltage combinations shown in Table 2 to the electrodes A, B, and C.

TABLE 2

| Separation direction | A voltage | B voltage | C voltage | D voltage |
|---|---|---|---|---|
| I | + | − | − | − |
| II | − | + | + | − |
| III | − | − | − | + |

That is, in FIG. 6, particles can be directed to flow pass I, II, or III by generating an electric field to attract the particles to the top side, center, or bottom side in the vicinity of the flow pass junction.

The microchip 50 can separate particles without forming a filter within the flow pass by using a micropump 53 as the main propulsion force for the solution. Since separated particles do not accumulate in the area wherein the particles are separated, the particle separation performance does not deteriorate over time.

Since the previously described microchips 10 and 50 use electrophoresis supplementally to separate particles, a voltage may be applied between flow passes. Normally, a voltage application of 2~3 kV/cm is necessary, however, a voltage of approximately 40~60 V is used since the flow pass width is at most approximately 200 $\mu$m. Such a voltage is extremely low compared to the voltage of, for example, several kilovolts applied when using electrophoresis as a particle propulsion force.

The present invention is not limited to the previously described embodiments, and may be variously modified.

For example, in FIG. 4, a CCD line sensor or the like may be provided along the main flow pass 54*c* to detect the movement of particles in the flow pass direction within the main flow pass 54*c* so as to selectively recover only desired particles by directing only the desired particles (e.g., particles containing DNA, protein or the like) to either flow pass I or flow pass II.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A microchip comprising:
   a flow pass for containing a solution having particles therein;
   a particle capture unit, including a plurality of projections, disposed on a deflection side of said flow pass for capturing at least a portion of said particles between said plurality of projections; and
   a deflection mechanism for deflecting said portion of said particles as said particles flow through said flow pass;
   wherein said particle capture unit protrudes into only a portion of a cross section of said flow pass.

2. A microchip according to claim 1, wherein said plurality of projections protrudes from said deflection side of said flow pass in a direction transverse to a direction of flow of said flow pass.

3. A microchip according to claim 1, wherein said plurality of projections protrudes into only a portion of a cross section of said flow pass.

4. A microchip according to claim 1, wherein each of said plurality of projections has a columnar form.

5. A microchip according to claim 1, wherein each of said plurality of projections is a plate.

6. A microchip according to claim 1, wherein said deflection mechanism is adapted to direct said portion of said particles towards said deflection side of said flow pass so as to be captured in said particle capture unit.

7. A microchip according to claim 1, wherein said deflection mechanism is adapted to direct said portion of said particles away from said deflection side of said flow pass.

8. A microchip according to claim 1, wherein said deflection mechanism is adapted to generate a field in a direction transverse to a direction of flow of said flow pass.

9. A microchip according to claim 8, wherein said field is a magnetic field, said portion of said particles being magnetic particles so as to be deflected by said magnetic field.

10. A microchip according to claim 8, wherein said field is an electric field, said portion of said particles being electrically charged so as to be deflected by said electric field.

11. A microchip according to claim 10, wherein said deflection mechanism comprises electrodes for generating said electric field.

12. A microchip according to claim 1, further comprising a micropump for causing said solution to flow through said flow pass.

13. A microchip according to claim 1, further comprising first and second propulsion electrodes, wherein a voltage applied across said first and second propulsion electrodes causes said particles to flow through said flow pass.

14. A method for separating particles from a solution containing said particles, the method comprising the steps of:
  causing said particles to flow through a flow pass of a microchip;
  forming, in a deflection region of said flow pass, a field in a direction transverse to a direction of flow of said flow pass, said field deflecting a portion of said particles to a deflection surface of said flow pass; and
  capturing said portion of said particles between a plurality of projections formed on said deflection surface in said deflection region of said flow pass, said plurality of projections protruding into only a portion of a cross section of said flow pass.

15. A method according to claim 14, further comprising the steps of:
  forming, in said deflection region, a field for deflecting said portion of said particles away from said particle capture unit; and
  causing said particles to flow through said flow pass, said particles being segregated from said solution and released from said microchip.

16. A method according to claim 14, wherein said plurality of projections protrudes into only a portion of a cross section of said flow pass.

17. A method according to claim 14, wherein said plurality of projections protrudes from said deflection region of said flow pass in said direction transverse to said direction of flow of said flow pass.

18. A method according to claim 14, wherein said step of causing said particles to flow comprises the step of pumping said solution with a micropump.

19. A method according to claim 14, wherein said step of causing said particles to flow comprises the step of applying a voltage across first and second propulsion electrodes disposed on opposing ends of said flow pass.

* * * * *

UNITED STATES PATENT AND TRADEMARK OFFICE
CERTIFICATE OF CORRECTION

PATENT NO.   : 6,822,180 B2
DATED        : November 23, 2004
INVENTOR(S)  : Yasuhisa Fujii et al.

It is certified that error appears in the above-identified patent and that said Letters Patent is hereby corrected as shown below:

<u>Title page,</u>
Item [75], Inventors, delete "Yusuhiro Sando", and insert -- Yasuhiro Sando --.

Signed and Sealed this

Seventeenth Day of May, 2005

JON W. DUDAS
*Director of the United States Patent and Trademark Office*